United States Patent [19]
Fukutani et al.

[11] Patent Number: 5,594,572
[45] Date of Patent: Jan. 14, 1997

[54] LIQUID CRYSTAL DISPLAY ELEMENT WITH GAP UNIFORMITY

[75] Inventors: Hiroshi Fukutani, Tsuzuki-gun; Hiroshi Ohnishi; Shuichi Uebe, both of Nara; Akihiro Horita, Yamatokoriyama, all of Japan

[73] Assignee: Sharp Kabushiki Kaisha, Osaka, Japan

[21] Appl. No.: 402,335

[22] Filed: Mar. 10, 1995

[30] Foreign Application Priority Data

Mar. 18, 1994 [JP] Japan ................. 6-049197
Feb. 2, 1995 [JP] Japan ................. 7-016040

[51] Int. Cl.6 .................................................. G02F 1/1339
[52] U.S. Cl. ............................................................. 349/155
[58] Field of Search ................................................. 359/81

[56] References Cited

U.S. PATENT DOCUMENTS 5,044,733  9/1991  Kamoi et al. ...................... 359/81

FOREIGN PATENT DOCUMENTS

| 18685 | 4/1984 | Japan . | |
| 150224 | 7/1987 | Japan . | |
| 63-6527 | 1/1988 | Japan | 359/81 |
| 96626 | 4/1989 | Japan . | |
| 3-80224 | 4/1991 | Japan | 359/81 |
| 3102323 | 4/1991 | Japan | 359/81 |
| 313727 | 11/1992 | Japan . | |
| 5281555 | 10/1993 | Japan | 359/81 |
| 667181 | 3/1994 | Japan | 359/81 |
| 503180 | 4/1994 | Japan . | |

*Primary Examiner*—William L. Sikes
*Assistant Examiner*—James A. Dudek
*Attorney, Agent, or Firm*—David G. Conlin; Brian L. Michaelis

[57] ABSTRACT

A liquid crystal display element including at least two kinds of spherical particles as a gap holding material in which each hardness is different in liquid crystal injected into a gap between a pair of substrates. Particle diameter accuracy of each particle is not more than 4%, a particle diameter of the particle with high hardness is not more than a particle diameter of the particle with low hardness, a number of the particle with high hardness to the particle with low hardness is 1 to 4, an average particle diameter of the particle with low hardness to the particle with high hardness is 1 to 1.05 and compression modulus of the particle with high hardness to the particle with low hardness is 1.14 to 14.3. As a result, gap uniformity can be improved. Moreover, occurrence of gap irregularity at the time of low temperature and of impact can be prevented.

2 Claims, 3 Drawing Sheets

MIXING RATIO OF BEAD AND GAP IRREGULARITY LEVEL AT THE TIME OF HIGH TEMPEPATURE AND IMPACT

RANK A·B: SUPERIOR PRODUCT
RANK C·D: INFERIOR PRODUCT

FIG. 3

DIFFERENCE IN PARTICLE DIAMETER AND GAP INNER-FACE UNIFORMITY

FIG. 4

PARTICLE DIAMETER ACCURACY AND GAP INNER-FACE UNIFORMITY

FIG. 5

LIQUID CRYSTAL DISPLAY ELEMENT WITH GAP UNIFORMITY

FIELD OF THE INVENTION

The present invention relates to a liquid crystal display element.

BACKGROUND OF THE INVENTION

A liquid crystal display element is composed of two substrates which are constantly spaced and liquid crystal which is injected into a gap between the two substrates. It is desirable that the gap between the two substrates is uniform so as to obtain a liquid crystal display element which provides satisfactory display. Moreover, it is desirable that a liquid crystal display element has no irregularity of a gap. The irregularity of a gap is caused by a partial distortion of the substrate due to pressing and by a distortion of the substrate due to a swelling of liquid crystal at high temperature.

Therefore, in order to obtain an uniform gap, generally, spherical gap holding materials are scattered between the substrates.

As a method of improving an uniformity of a gap in a liquid crystal display element, a technique that a diameter of a spacer which is a gap holding material in a liquid crystal panel is allowed to be smaller than a thickness of sealant around the spacer, and that an inside of the liquid crystal display element is allowed to be in a negative pressure state is disclosed in Japanese Examined Patent Publication No. 59-18685/1984 (Tokukosho 59-18685). However, when this method for allowing the inside of the liquid crystal display element to be in the negative pressure state is used in the case where the element is left in low temperature, air bubbles which are substantially vacuum are liable to occur. This is because since the inside of the element is under negative pressure, a change in capacity of the substrates and a change in in side capacity of the liquid crystal display element do not follow the decrease in volume of liquid crystal due to low temperature.

In order to prevent the air bubbles from occurring at low temperature, Japanese Unexamined Patent Publication No. 1-96626/1989 (Tokukaihei 1-96626) discloses a method of using a mixture of rigid granules and polymeric particles including epoxy radical.

In addition, as a method of preventing irregularity of a gap at high temperature and irregularity of a gap due to pressing, Japanese Unexamined Patent Publication No. 63-6527/1988 discloses a method of using glass fiber and plastic beads which are larger than the glass fiber. Moreover, as another method, Japanese Unexamined Patent Publication No. 62-150224/1987 (Tokukaisho 62-150224) discloses a method of using a mixture of a hard gap holding material which does not show heat fusibility and a soft gap holding material which has an average particle diameter of not more than twice as a particle diameter of the hard gap holding material and which shows heat fusibility.

When the above-mentioned conventional gap holding material with a wide distribution of a particle diameter is used, an amount of the holding material which contacts with upper and lower substrates contributing to gap holding in a liquid crystal display element is small, so the substrates can bend freely to a certain extent. Therefore, when a liquid crystal display element is transported and handled, and when it is handled after being installed to a product such as a personal computer, if excessive impact is given to the liquid crystal display element, the impact can be absorbed by bending of the substrates.

As a result, the impact seldom causes irregularity of a gap, and quality of a liquid crystal display element is seldom lowered. Furthermore, since distribution of a particle diameter is wide, irregularity of a gap occurs in a liquid crystal display element at the beginning. Therefore, even if irregularity of a gap occurs due to the impact, it is not noticeable.

However, in the case where the mixture of glass fiber and plastic beads, the mixture of a hard gap holding material and a soft gap holding material which shows heat fusibility and the mixture of rigid granules and adhesive polymeric particles including epoxy radical material with low hardness are used, the following points are not specified. Namely, a difference in a particle diameter between a gap holding material with low hardness and a gap holding material with high hardness and a mixing ratio of them, hardness of a gap holding material with low hardness and particle diameter accuracy of the gap holding materials are not specified.

Furthermore, optimum combination of the gap with high hardness and the gap holding material with low hardness is not clear. These points are important factors which greatly affect improvement in gap uniformity and a gap holding characteristic at the time of high temperature and impact. For example, if the hardness of a gap holding material with low hardness is too low, gap holding at the time of high temperature and of impact is not effective.

Incidentally, recently, enlargement of an area of a liquid crystal panel using a liquid crystal display element, thinning of substrate and high contrast of a panel characteristic further require gap accuracy of a liquid crystal display element. In prior arts, a resin-type gap holding material in which CV value representing particle diameter accuracy is about 6% was generally used. Therefore, it is hard to satisfy the demand of the gap accuracy.

However, as a spherical gap holding material composed of resin, recently, one with high particle diameter accuracy which is disclosed in PCT Unexamined Patent Publication No. 6-503180/1994 (Tokuhyohei 6-503180) can be obtained, for example. The above Publication discloses the case where a liquid crystal display element is produced by independently using the gap holding material with high particle diameter accuracy. Since this gap holding material is composed of resin, when a liquid crystal display element is cooled to a low temperature, the liquid crystal display element is bent to extent that can correspond to decrease in volume of liquid crystal, and its capacity can be also decreased. Therefore, vacuum air bubbles which are seen when the gap holding material composed of an inorganic material is used do not occur, so it is possible to improve gap uniformity.

When a resin gap holding material with high accuracy of a particle diameter in which 10% compression modulus is 214 to 600 kg/mm$^2$ and particle diameter accuracy (CV value) is not more than 4% is used, gap accuracy can be improved. Nevertheless, since the above gap holding material has high particle diameter accuracy, most gap holding material which spreads between a pair of substrates contributes to gap holding between the upper and the lower substrates, so the pair of substrates is held rigidly. A degree of freedom from bending of the substrates becomes smaller compared to a liquid crystal display element using a conventional resin gap holding material with slightly wide distribution of a particle diameter.

If a degree of freedom from bending of the substrates becomes small, image quality of a liquid crystal display element is remarkably deteriorated. The reason for this will be mentioned in the case where the liquid crystal display element is heated to high temperature and particularly, the element is held vertically, for example. In this case, since increase in volume of a liquid crystal material due to thermal expansion becomes greater than increase in capacity of the substrate, extra amount of liquid crystal is needed. As a result, the capacity cannot be absorbed by bending. Therefore, liquid crystal remains in a lower section of the substrate and gap irregularity occurs, so image quality of a liquid crystal display element is deteriorated.

Figure 5:
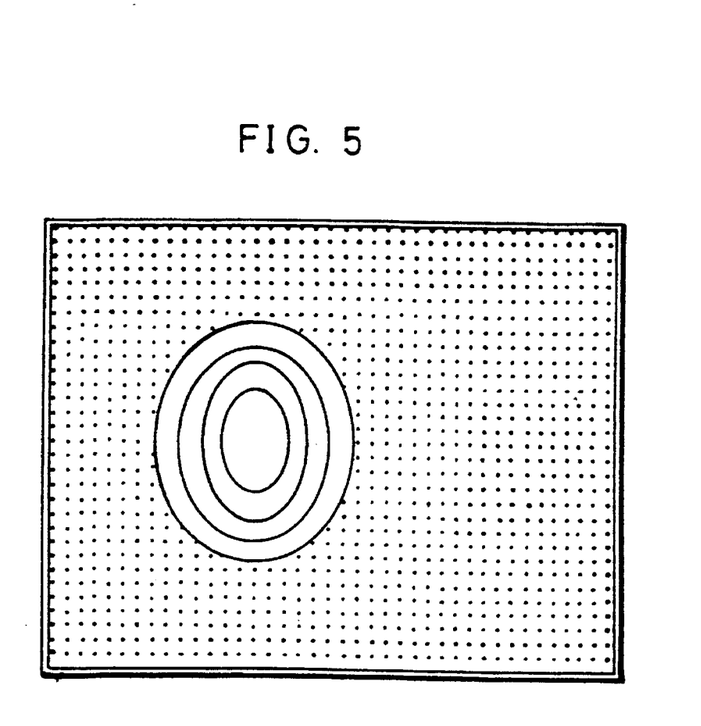
FIG. 5 is an explanatory drawing which shows spiral gap irregularity which occurs in the case where excessive impact is given to a conventional liquid crystal display element.

In other words, when a gap holding material with high particle diameter accuracy is independently used so as to make a gap uniform, there arises a problem that spiral gap irregularity which is shown in FIG. 5 occurs according to the above reason at the time of impact. Moreover, since gap uniformity is high, even if slight gap irregularity occurs due to impact, it is visually noticeable, so there also arises a problem that quality of a liquid crystal display element is deteriorated.

SUMMARY OF THE INVENTION

It is an object of the present invention to provide a liquid crystal display element in which a gap holding material with high particle diameter accuracy is used, gap uniformity is obtained, occurrence of gap irregularity due to high temperature and to impact is prevented and occurrence of vacuum air bubbles at low temperature is prevented.

In order to achieve the above object, a liquid crystal display element of the present invention is characterized by including:

liquid crystal which is injected into a gap between a pair of substrates oppositely arranged; and at least two kinds of spherical particles in which hardness is different and particle diameter accuracy is not more than 4% as a gap holding material for holding the gap in the liquid crystal.

With the above arrangement, the gap between the substrates is held by the two kinds of spherical particles included in the liquid crystal. Since these particles has particle diameter accuracy of not more than 4% which is high particle diameter accuracy, gap uniformity is improved due to increase in a number of supporting points of the substrates.

In addition, while gap uniformity is being held by the particles with different hardness, occurrences of gap irregularity at the time when the liquid crystal display element is kept in high temperature and gap irregularity at the time when excessive impact is given can be prevented.

In other words, in the case where the liquid crystal display element is left in high temperature, particles with a large particle diameter in the particles with low hardness increase a thickness of the gap through recovery from deformation and absorbs increase in volume of a liquid crystal material due to thermal expansion, so irregularity due to excessive remains of liquid crystal does not occur. Moreover, also in the case where the liquid crystal display element is left in low temperature, while a thickness of the gap can be kept uniform by the particle with high hardness, the substrates are bent according to decrease in volume of the liquid crystal by deformation of the particle with low hardness. As a result, occurrence of vacuum air bubbles can be prevented. Furthermore, in the case where impact is given to the liquid crystal display element, since the particle with low hardness absorbs the impact by recovery from deformation according to bending of the substrate, spiral distortion of the liquid crystal display element, namely, gap irregularity does not occur.

As a result, gap uniformity is improved and at the same time a liquid crystal display element with high quality without gap irregularity can be obtained by using a simple method wherein at least two kinds of particles are mixed.

For a fuller understanding of the nature and advantages of the invention, reference should be made to the ensuing detailed description taken in conjunction with the accompanying drawings.

DESCRIPTION OF THE EXAMPLES

The following will discuss examples of the present invention referring to FIGS. 1 through 4.

Figure 1:
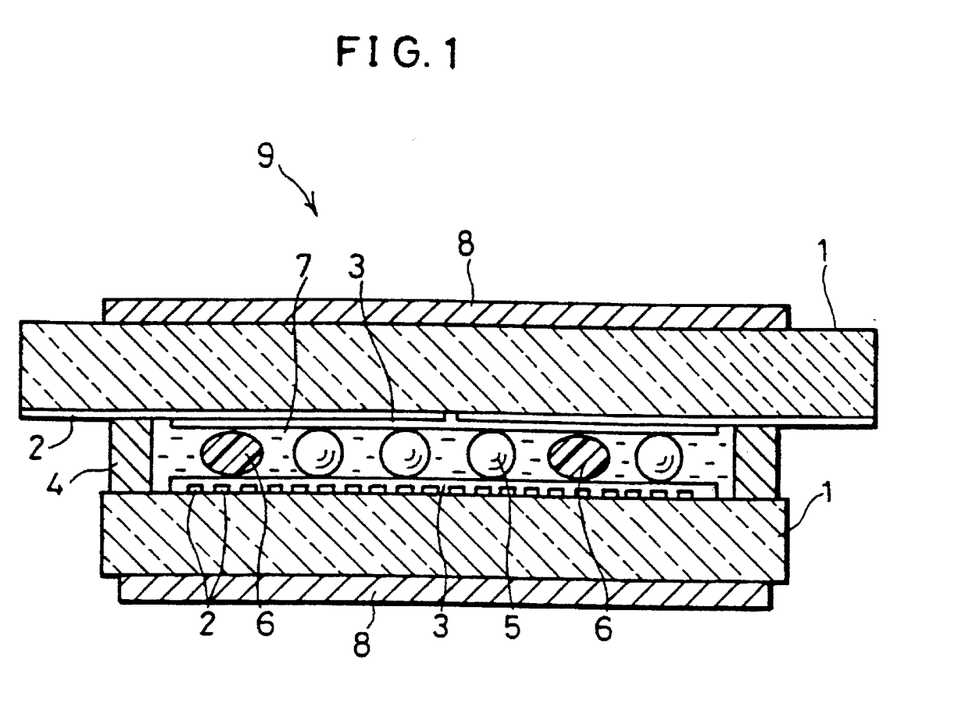
FIG. 1 is a vertical cross section which shows arrangement of a liquid crystal display element of the present invention.

As shown in FIG. 1, for example, a liquid crystal display element 9 of the present invention is arranged so as to have a pair of glass substrates 1.1 and so that liquid crystal 7 is injected into a gap which is formed by the two substrates.

Transparent electrodes 2.2 are oppositely arranged in the gap side of the glass substrates 1.1. Moreover, alignment films 3.3 are provided on the respective transparent electrodes 2.2. Meanwhile, reflecting plate 8.8 are provided on an outer side surfaces of the glass substrates 1.1.

In addition, an outskirts in the gap side of the glass substrates 1.1 is sealed by a sealing material 4, and the liquid crystal 7 is injected thereinto. Together with the liquid crystal 7, beads 5 with high hardness which are a particle with high hardness as a gap holding material and beads 6 with low hardness which are particle with low hardness are injected into the gap. These hold the gap between the glass substrates 1.1 so as to have a prescribed thickness.

As the above beads to be used, ones which have a CV value representing the particle diameter accuracy of not more than 4%, and more preferably not more than 3% are used. In this case, the number of effective particles which contact with the upper and the lower substrates is large, so this effectively acts on gap uniformity and cushioning properties which absorbs impact, etc. from the outside by means of deformation. Here, the CV value is obtained by the formula: (a standard deviation of a particle diameter/an average particle diameter)×100 (%).

Furthermore, as the bead, resin beads which satisfy the following requirements are used. First, resin beads in which 10% compression modulus is 300 to 600 kg/mm$^2$ are used.

Here, 10% compression modulus is compression modulus when a particle diameter is deformed 10% due to compression, and it is represented by the following formula.

$$\text{10\% compression modulus } E = \frac{3 \times F \times (1 - K^2)}{2^{1/2} \times S^{1.5} \times R^{1/2}} \qquad \text{[Formula 1]}$$

E: compression modulus (kg/mm²)

F: compression force (kg)

K: Poisson's ratio of particle

S: compressive deforming amount (mm)

R: radius of particles (mm)

One particle is loaded towards its center, and a load at the time when the particle is shifted 10%, namely, a compression force F and a compressive deforming amount S are measured so that the 10% compression modulus can be obtained according to the above formula. At this time, a micro-compression test machine (made by Shimadzu Corporation) was used for the measurement.

When the 10% compression modulus is smaller than 300 kg/mm², deformation of beads is not uniform, and gap irregularity becomes very great. Moreover, it is hard to get resin beads in which 10% compression modulus exceeds 600 kg/mm². Therefore, beads with high hardness and beads with low hardness in which a 10% compression modulus is 300 to 600 kg/mm² should be used.

As a result, the beads with high hardness provide gap uniformity, and the beads with low hardness are deformed within the gap greater than the beads with high hardness so as to act as a cushion. Further, a degree of freedom from bending of a liquid crystal panel substrate is obtained so that occurrence of gap irregularity due to high temperature and impact is prevented.

Next, both beads are selected so that a hardness ratio of the beads with high hardness to the beads with low hardness, namely, a ratio of compression modulus of the beads with low hardness to compression modulus of the beads with high hardness (compression modulus of beads with high hardness/compression modulus of beads with low hardness) satisfies the following value, and a mixture of them is used. It is preferable that the compression modulus is in a range of 1.14 to 14.3, and more preferable in a range of 1.14 to 2.

For example, in the case where beads with low hardness in which 10% compression modulus is 350 kg/mm² is mixed with beads with high hardness in which 10% compression modulus is 400 kg/mm², its compression modulus ratio becomes 400/350=1.14.

Furthermore, in the case where as beads with high hardness, resin beads with highest hardness (10% compression modulus is about 600 kg/mm²) is used and as beads with low hardness, usable beads with lowest hardness (10% compression modulus is about 300 kg/mm²) is used, its ratio is 600/300=2.

In addition, as beads with high hardness, inorganic beads composed of $SiO_2$, etc. may be used besides the above resin beads. In the case where as beads with high hardness, $SiO_2$ beads (10% compression modulus is about 5000 kg/mm²) is used and as beads with low hardness, the beads with 10% compression modulus of 350 kg/mm² is used, its ratio is 5000/350=14.3.

As mentioned above, a smallest value of a compression modulus ratio of beads with high hardness to beads with low hardness is about 1.14 in example mentioned later, and a largest value of the compression modulus ratio is 14.3 which is mentioned in example in the case where inorganic beads were used as beads with high hardness. Therefore, a range of the compression modulus ratio is 1.14 to 14.3.

However, as known, the inorganic beads has a problem that its excessive hardness is liable to damage an alignment film, etc. Therefore, a more preferable combination of beads with high hardness and beads with low hardness is a resin beads combination. Since a smallest compression modulus ratio is 1.14 as mentioned above and 2 is a largest compression modulus ratio, a more preferable range of the compression modulus ratio is 1.14 to 2.

Incidentally, as to a particle diameter of the above-mentioned beads with high hardness and low hardness, in the case where the particle diameter of the beads with low hardness is smaller than that of the beads with high hardness, sufficient cushioning properties cannot be obtained. Moreover, when the particle diameter of the beads with low hardness is too larger compared to that of the beads with high hardness, the beads with low hardness affect gap uniformity, so the gap uniformity is deteriorated. Therefore, when (average particle diameter of beads with low hardness/ average particle diameter of beads with high hardness) is indicated as $\Delta d$, it is effective that $\Delta d$ is 1 to 1.05 and more preferably, 1.003 to 1.03.

In addition, as to a mixing ratio of the beads with high hardness and low hardness, excessive beads with low hardness deteriorates gap uniformity due to a large particle diameter, and excessive beads with high hardness deteriorates cushioning properties, so gap uniformity at high temperature becomes inferior. Furthermore, in the case where inorganic beads are used, vacuum air bubbles are liable to occur at low temperature. Therefore, it is effective that beads with high hardness : beads with low hardness=1:1 to 4:1 (number ratio). At this time, in the case where both the beads are composed of a same material, instead of the numerical ratio, the ratio may be represented by weight.

In the present example, as beads with low hardness, resin beads in which main ingredient is divinylbenzene-series polymer with 10% compression modulus of 300 to 370 kg/mm² and in which a CV value of a particle diameter distribution is not more than 3% (made by Kao Corporation, Product name: Lunapearl LC) were used.

Meanwhile, as beads with high hardness, beads in which a main ingredient is divinylbenzene-series polymer with 10% compression modulus of 370 to 600 kg/mm² and in which a CV value of particle diameter distribution is not more than 3% (made by Kao Corporation, Product name: Lunapearl LCH) were used. Moreover, as inorganic beads, beads in which a main ingredient is $SiO_2$ and a CV value is not more than 1.5% (made by Catalyst & Chemicals Industries Co., Ltd, Product name: Shinshikyu SW) were used.

Incidentally, when a static electricity is applied to an element while a liquid crystal display element is being produced, abnormal aligned section may occur around the particles. Moreover, in the case where a power is supplied to a liquid crystal display element, abnormal alignment state of liquid crystal in which particles form the core may occur. Due to such an abnormal alignment, a process for amending it is required and a rate of non-defective products is lowered.

Therefore, a material of particles may be selected or a surface of particles may be modified so that a zeta potential in wet spreading solution (pure water+alcohol) has minus polarity and an absolute value of not less than 25 mV. Here, in order to measure the zeta potential, a Leza Zeta potentiometer LEZA-600 made by Otsuka Electronics Co., Ltd. was used.

In this way, the above-mentioned abnormal alignment state of liquid crystal can be prevented by using particles in which surface polarity was controlled, thereby making it possible to improve productivity and image quality of a liquid crystal display element.

Here, since the number of particles which has to do with gap holding increases in a panel by using particles in which particle diameter distribution is small, it is possible to decrease a number of particle distribution compared to a conventional liquid crystal display element. Particularly in a negative-type liquid crystal display element, passing-through of a light in a particle section can be decreased and quality and a contrast characteristic of a liquid crystal display element can be improved. As a result, a liquid crystal display element with high quality and high reliability can be obtained without changing producing processes.

EXAMPLE 1

A transparent electrode and an alignment film having a prescribed configuration were formed on the respective two glass substrates, an aligning process was carried out and a seal frame was printed on one substrate by an epoxy-type sealing material.

As beads with low hardness, Lunapearl LC610 (average particle diameter: 6.10 μm, CV value: 3%, 10% compression modulus: 350 kg/mm$^2$) was used, and as beads with high hardness, Lunapearl LCH600 (average particle diameter: 6.00 μm, CV value: 3%, 10% compression modulus: 420 kg/mm$^2$) was used. A weight ratio of both the beads was 1:1.

Next, both the beads were dispersed in pure solution to which alcohol was added by using supersonic waves so that wet holding material spreading solution was produced. Then, the wet holding material spreading solution was dispersed on one substrate by means of a wet process so that distribution density was 70 to 160 pieces/1 mmφ. Thereafter, the substrates were laminated, and it was calcined at 150° C. for 1 hour while its whole surface was being pressurized so that a liquid crystal panel was obtained. Thereafter, the liquid crystal panel was finished through prescribed processes.

When gap inner-face uniformity of the above liquid crystal display element is measured, gap variation width was approximately ±0.02 μm. This is about ⅓ of a conventional panel, so it was confirmed that the gap uniformity was improved. Moreover, after the liquid crystal display element was vertically put up in a thermostatic chamber at 60° C. and it was observed 24 hours later, it was confirmed that there occurred no gap irregularity due to remains of liquid crystal.

In addition, the panel was installed to a module, and when estimation was made as to variable frequency vibration (10 to 57 Hz/0.075 mm, 58 to 500 Hz/1G sweeping time 11 min., 2h/± (X, Y, Z)) and impact (490 m/s$^2$, 11 msec, once/± (X, Y, Z)), it was confirmed that there occurred no spiral gap irregularity. The results are shown in Table 1.

EXAMPLE 2

The same beads with low hardness as example 1 was used, and as to beads with high hardness, Lunapearl LCH605 (average particle diameter: 6.05 μm, CV value: 3%, 10% compression modulus: 480 kg/mm$^2$) was used. A liquid crystal display element was finished in the same manner as example 1. Gap inner-face uniformity of the obtained panel had gap variation width of approximately ±0.02 μm. Moreover, as to the tests of leaving at high temperature, vibration and impact, the same results which were same as example 1 were obtained. The results are shown in Table 1.

EXAMPLE 3

The same beads with low hardness as example 1 was used, and as to beads with high hardness, Lunapearl LCH 595 (average particle diameter: 5.95 μm, CV value: 3%, 10% compression modulus: 400.420.440.460 kg/mm$^2$ (four kinds)) was used. The beads with high hardness and low hardness was scaled so that their wait ratio becomes 2:1. Thereafter, four kinds of spreading solutions were produced and four kinds of liquid crystal panels were finished in the same manner as example 1.

Gap inner-face variation width of the obtained four kinds of liquid crystal panels were approximately ±0.02 μm. Furthermore, as to the tests of leaving at high temperature, vibration and impact test, good results were obtained. The results are shown in Table 1.

TABLE 1

| Example No. | 1 | 2 | 3 | | | | 6 |
|---|---|---|---|---|---|---|---|
| Bead with high hardness | | | | | | | |
| 10% compression modulus (kg/mm$^2$) | 420 | 480 | 400 | 420 | 440 | 460 | approx. 5000 |
| Particle diameter (μm) | 6.00 | 6.05 | 5.95 | 5.95 | 5.95 | 5.95 | 6.00 |
| Bead with low hardness | | | | | | | |
| 10% compression modulus (kg/mm$^2$) | 350 | 350 | 350 | 350 | 350 | 350 | 350 |
| Particle diameter (μm) | 6.10 | 6.10 | 6.10 | 6.10 | 6.10 | 6.10 | 6.10 |
| Mixing ratio of beads (Beads with high hardness:beads with low hardness) | 1:1 | 1:1 | 2:1 | 2:1 | 2:1 | 2:1 | 1:1 |
| Gap uniformity | ○ | ○ | ○ | ○ | ○ | ○ | ○ |
| Gap irregularity level at impact | Δ | Δ | ○ | ○ | ○ | ○ | Δ |
| Gap irregularity level at high temperature | ○ | ○ | ○ | ○ | ○ | ○ | ○ |
| Compression modulus ratio | 1.2 | 1.37 | 1.14 | 1.2 | 1.26 | 1.31 | 14.3 |

○: superior
Δ: a little inferior

According to Table 1, it is found that the gap uniformity can be obtained and the gap irregularity at high temperature can be prevented by using a mixture of the beads with high hardness in which compression modulus is high and the particle diameter is slightly small and of the beads with low hardness in which compression modulus is slightly lower and the particle diameter is large.

COMPARATIVE EXAMPLE 1

As comparison with the above three examples, the following experiment was made.

Beads in which each 10% compression modulus is 350, 380, 420, 440, 480 kg/mm² were independently used, and except them, four kinds of liquid crystal panels were produced in the same manner as example 1. The gap uniformity and gap irregularity level were measured. The results are shown in Table 2.

TABLE 2

| Type of beads | Resin beads | Resin beads | Resin beads | Resin beads | Resin beads | Organic beads |
|---|---|---|---|---|---|---|
| 10% compression modulus | 350 kg/mm² | 380 kg/mm² | 420 kg/mm² | 440 kg/mm² | 480 kg/mm² | approx. 5000 kg/mm² |
| CV value of particle diameter | 3% | 3% | 3% | 3% | 3% | 1.5% |
| Gap uniformity | o | o | o | o | o | o |
| Gap irregularity due to impact | x | Δ | o | o | o | x |
| Gap irregularity due to high temperature | Δ | x | x | x | x | xx | o: superior
Δ: a little inferior
x: inferior
xx: very inferior

According to Table 2, in the case where beads with a same particle diameter and same hardness were used, gap irregularity due to impact can be improved by increasing the compression modulus, but gap irregularity due to high temperature is deteriorated. Therefore, it is found that there exist no example that the both gap irregularities can be improved.

Meanwhile, as shown in Table 1, it is found that target gap uniformity and gap irregularity level due to impact and to high temperature can be improved by mixing the beads with different hardness and particle diameter.

EXAMPLE 4

Bead with low hardness which is same as example 1 was used, and as to beads with hardness, Lunapearl LCH 608 (average particle diameter 6.08 μm, CV value: 3%, 10% compression modulus: 420 kg/mm²) was used. The beads with high hardness and low hardness were scaled so that their weight ratio becomes 2:1. Thereafter, spreading solution was produced and a liquid crystal panel was finished in the same manner as example 1. Gap inner-face variation width of the obtained panel was approximately ±0.02 μm. As to the tests of leaving at high temperature, vibration and impact, results which are also same as example 1 were obtained.

EXAMPLE 5

Beads with high hardness and low hardness which are same as example 1 were used and were scaled in the same manner. A wet holding material spreader which spread beads by giving high pressure air or an electric charge was used so as to scale one of the beads to a prescribed amount. Then, the wet holding material spreader spread the beads to the substrates and after scaling the other beads to the same amount, it spread the one of the beads on the spread substrate. Here, a distribution amount of the beads is same as example 1. A liquid crystal panel was produced in the same manner as example 1 by using the substrates.

As to the tests of gap uniformity, act, the same results as example 1 were obtained. The results are shown in Table 1.

EXAMPLE 6

Beads with low hardness which is same as example 1 were used, and as to the beads with high temperature, inorganic beads (particle diameter: 6.00 μm) were used. Two kinds of beads were dispersed by using the wet spreader which is same as example 5. At this time, a necessary amount of the beads with low hardness and high hardness was obtained according to specific gravity so that a number ratio of the beads becomes 1:1. Here, a distribution amount of the beads was 30 to 70 pieces/1 mmφ (distribution amount of the inorganic beads was 15 to 35 pieces/1 mmφ) according to a viewpoint of vacuum air bubbles at low temperature. A liquid crystal panel was produced in the same manner as example 1 by using the substrates.

As to the tests of gap uniformity, leaving at high temperature, vibration and impact, the results which are same as example 1 were obtained. The results are also shown in Table 1.

COMPARATIVE EXAMPLE 2

Except that the inorganic beads used in example 6 were used, a liquid crystal display element was produced in the same manner as example 1, and its gap uniformity and a gap irregularity level at the time of high temperature and of impact were measured. The results are shown in Table 2. According to Table 2, it is clear that the use of the inorganic beads having high compression modulus and excellent accuracy of a particle diameter provide very bad gap irregularity at high temperature.

Likewise in the present example, in the case where a mixture of beads composed of different materials are used, when the wet spreading method is used, a difference in specific gravity is liable to cause variation in a distribution number ratio, so it is considered that the wet dispersing method is suitable.

COMPARATIVE EXAMPLE 3

The beads with low hardness and high hardness which are same as example 1 were used, spreading solution was produced and a liquid crystal panel was produced in the same manner as example 1. Here, a mixing ratio of the beads with high hardness to the beads with low hardness was 1:2.

The panel had the same gap inner-face uniformity as example 1. However, after the panel was vertically left in a thermostatic chamber at 60° C. for 24 hours, gap irregularity occurred in a lower part of the panel due to remains of liquid crystal. Furthermore, the same impact test as example 1 caused spiral gap irregularity.

This occurred because not the beads with high hardness but the beads with low hardness contributed to gap holding, and a lot of distribution amount of the beads with low hardness which supports the gap made a deforming amount of the individual beads in the panel small, so a degree of freedom from bending of the panel became small.

COMPARATIVE EXAMPLE 4

The same beads with low hardness (particle diameter 6.10 μm) which are same as example 1 were used, and as to beads with high hardness, Lunapearl LCH 615 (particle diameter: 6.15 μm, CV value: 3%, 10% compression modulus: 420 kg/mm$^2$) were used. Similarly to example 1, spreading solution was made so that a mixing ratio becomes 1:1 and a liquid panel was finished.

The panel has the same gap inner-face uniformity as example 1. However, after the panel was vertically left in a thermostatic chamber at 60° C. for 24 hours, gap irregularity occurred in a lower part of the panel due to remains of liquid crystal. Moreover, spiral gap irregularity occurred due to the impact test which is same as example 1.

Since a particle diameter of the beads with high hardness is larger than that of the beads with low hardness, the beads with high hardness hold the gap of the panel. Therefore, it is considered that the gap irregularity occurred because the beads with low hardness and with a lot of deforming amount, which can provide cushioning properties to the panel, cannot contribute to the panel.

COMPARATIVE EXAMPLE 5

The beads with low hardness (Lunapearl LC610) which are same as example 1 was used, and as to beads with high hardness, Lunapearl LCH 570 (average particle diameter: 5.70 μm, CV value: 3%, 10% compression modulus: 420 kg/mm$^2$) was used. Spreading solution was produced so that its mixing ratio becomes 1:1 and a liquid crystal panel was finished in the same manner as example 1.

The panel had gap inner-face uniformity of about ±0.05 μm in gap variation width. There was no great difference in the gap uniformity between this case and the case where conventional beads having a CV value of about 6% was used, so an effect by improvement could not be obtained. In other words, in the case where a particle diameter of the beads is too large, even if accuracy of the individual particle diameters is high, the beads have the particle diameter accuracy which is same as that of the conventional product. Therefore, it is found that good results cannot be obtained.

COMPARATIVE EXAMPLE 6

The beads with low hardness and high hardness which are same as example 1 were used and a liquid crystal panel was finished in the same manner as example 1. Here, a mixing ratio was 1:9.

The panel had the same gap inner-face uniformity as example 1. However, after the panel was left in a thermostatic chamber at 60° C. for 24 hours, gap irregularity occurred due to remains in a lower section of the liquid crystal.

It is considered that the gap irregularity occurred because a distribution ratio of the beads with low hardness, in which a deforming amount is large so as to provide cushioning properties to the panel, was so small that sufficient cushioning properties were not shown.

EXAMPLE 7

As to beads with low hardness, Lunapearl LC610 was used, and as to beads with high hardness, Lunapearl LCH600 was used. A mixing ratio of the beads with high hardness to the beads with low hardness was changed to 0:1, 1:2, 1:1, 2:1, 4:1 and 9:1 (a mixing ratio of the beads with high hardness to the all the beads was 0%, 33%, 50%, 66%, 80% and 90%) so that a liquid crystal panel was produced.

Figure 2:
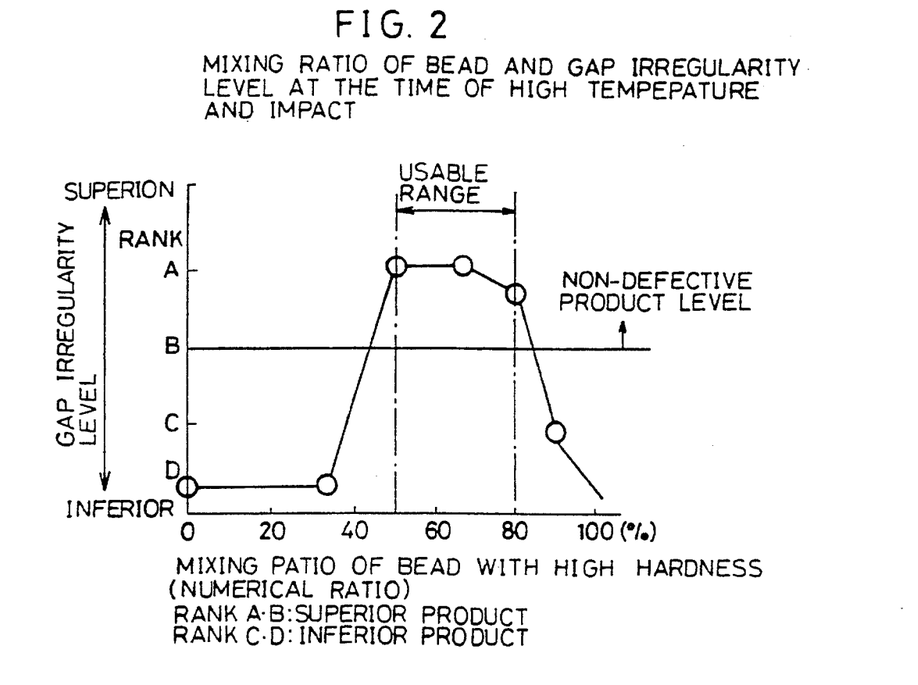
FIG. 2 is a graph which shows a relationship between a mixing ratio of beads with high hardness and a gap irregularity level due to high temperature and to impact test in a liquid crystal display element.

The results which were obtained by estimating gap irregularity levels of the obtained panel after the tests of high temperature (after being left at 60° C. and for 24 hours) and impact in 10 panels are shown in Table 3 and in FIG. 2.

TABLE 3

| Mixing ratio of beads with high hardness to all beads (beads with with hardness: beads with low hardness) | After panel is vertically left at 60° C. for 24 hrs | | After impact test | | Total judgement |
|---|---|---|---|---|---|
| | A number of panels where gap irregularity occurs | Judgement | A number of panels where gap irregularity occurs | Judgement | |
| 0% (0:1) | 4/10 panels | D | 5/10 panels | D | D |
| 33% (1:2) | 3/10 panels | D | 3/10 panels | D | D |
| 50% (1:1) | 0/10 panel | A | 0/10 panel | A | A |
| 66% (2:1) | 0/10 panel | A | 0/10 panel | A | A |
| 80% (4:1) | 1/10 panel | B | 0/10 panel | A | A–B |
| 90% (9:1) | 2/10 panels | C | 2/10 panels | C | C |

A: 0/10
B: 1/10
C: 2/10
D: 3/10 and more

According to the table and the figure, it is found that in the range that a mixing ratio of the beads with high hardness is about less than 45% and more than 85% (an intersection of a line and a non-defective product level (more than B rank)), the gap irregularity is in a defective level. Here, it is expected that an optimum mixing ratio changes to a certain extent according to a combination of a ratio of a particle diameter and of a 10% compression modulus of the beads with low hardness to that of the beads with high hardness. As a result, an usable range of the mixing ratio of the beads with high hardness to the beads with low hardness in which the gap irregularity level is not in a defective level is 1:1 to 4:1 (50 to 80%) where the non-defective level could be obtained in the present example.

EXAMPLE 8

As to beads with low hardness, Lunapearl LC610 which are same as example 1 were used, as to beads with high hardness, Lunapearl LCH in which 10% compression modulus is 420 kg/mm$^2$ CV value is 3% and an average particle diameter is changed to 6.10, 6.00, 5.90, 5.80, 5.70 and 5.60

μm was used. A mixing ratio of the beads with low hardness to the beads with high hardness was 1:1 and a liquid crystal panel was produced in the same manner as example 1. Results of measuring gap uniformity of each panel are shown in FIG. 3.

Figure 3:
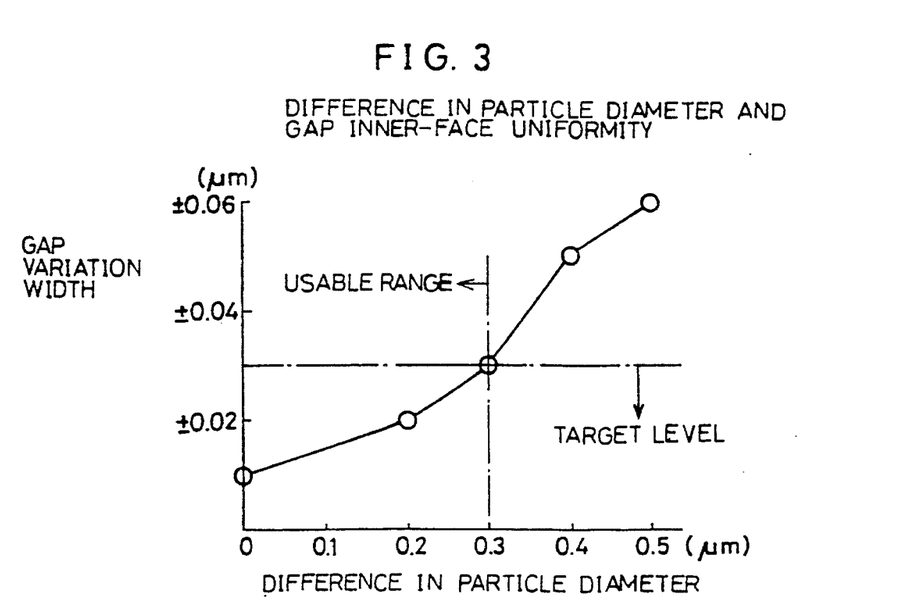
FIG. 3 is a graph which shows a relationship between a difference in a particle diameter of beads with low hardness and the high hardness and gap uniformity.

According to FIG. 3, it is found that when a difference in a particle diameter between the beads with low hardness and the beads with high hardness becomes larger than 0.3 μm, the uniformity becomes about ±0.06 μm which is same as a conventional liquid crystal panel. Therefore, it is preferable that the particle diameter of the beads with high hardness is 6.10 to 5.80 μm, and a difference in the particle diameter between the beads with high hardness and the beads with low hardness, namely, Δd indicating an average particle diameter of the beads low hardness/average particle diameter with high hardness is 1 to 1.05.

In addition, when the difference in the particle diameter between the beads with low hardness and the beads with high hardness is 0, a deforming amount of the beads with low hardness in the panel justly becomes smaller compared to the case the difference in the particle diameter exist. As a result, it is expected that a gap irregularity characteristic due to high temperature and to impact is deteriorated.

Therefore, it is desirable that the particle diameter of the beads with high hardness is in the range of 5.90 μm where the gap variation width becomes ±0.02 μm and 6.08 μm, namely, it is more preferable that Δd is 1.003 to 1.03.

EXAMPLE 9

A liquid crystal panel was produced in the same manner as example 1 by using conventional four kinds of beads in which each CV value of particle diameter distribution is 3%, 4%, 5% and 6%. Gap inner-face uniformity of the obtained panel is shown in FIG. 4.

Figure 4:
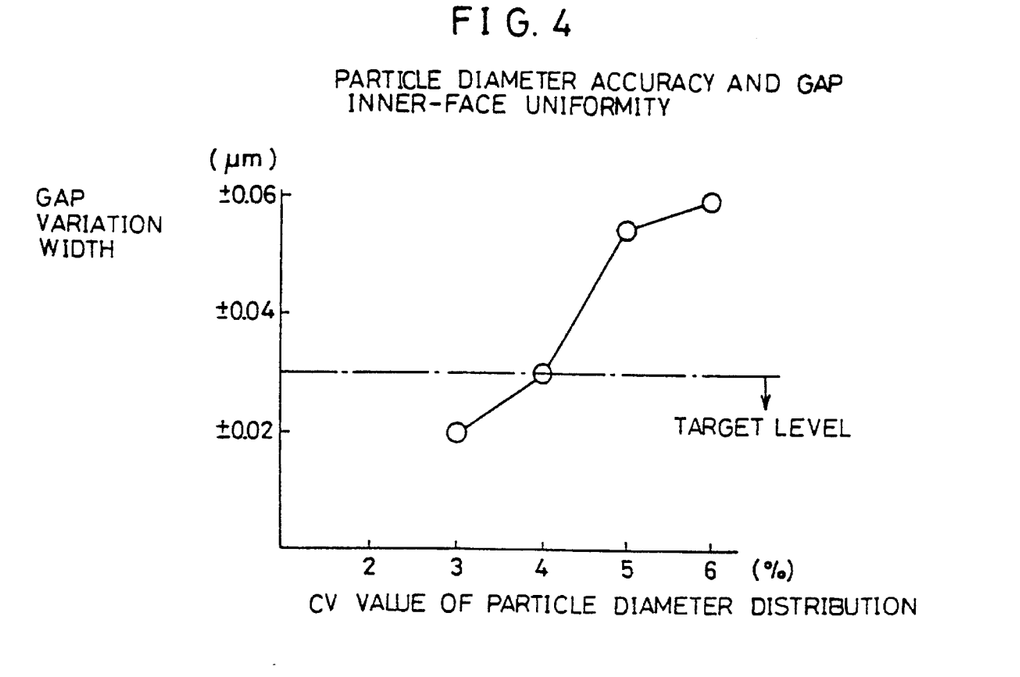
FIG. 4 is a graph which shows a relationship between particle diameter accuracy and gap uniformity in a liquid crystal display element.

According to FIG. 4, gap variation width can be reduced to ⅓ of the conventional one by using beads with a CV value of not more than 4%.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display element comprising: liquid crystal which is injected into a gap between a pair of substrates oppositely arranged; and at least two kinds of spherical particles in which each hardness is different and particle diameter accuracy is not more than 4% as a gap holding material for holding the gap in said liquid crystal;

said at least two kinds of spherical particles including a second particle composed of resin and a first particle composed of an inorganic material and wherein said particle composed of an inorganic material has a main ingredient of $SiO_2$ in which compression modulus at a time when the particle diameter is deformed 10% is approximately 5000 kg/mm$^2$.

2. A liquid crystal display element comprising: liquid crystal which is injected into a gap between a pair of substrates oppositely arranged; and at least two kinds of spherical particles in which each hardness is different and particle diameter accuracy is not more than 4% as a gap holding material for holding the gap in said liquid crystal;

wherein said at least two kinds of particles are composed of resin, and wherein said particles composed of resin are set so that a zeta potential of surfaces of the particles in a spreading solution which is produced for dispersing the particles on the substrates has minus polarity and the surface polarity of the particles is set so that its absolute value becomes not less than 25 mV.

* * * * *